(12) United States Patent
Brown

(10) Patent No.: US 7,365,464 B2
(45) Date of Patent: Apr. 29, 2008

(54) COMPOSITE ROTOR AND OUTPUT SHAFT FOR GALVANOMETER MOTOR AND METHOD OF MANUFACTURE THEREOF

(75) Inventor: David C. Brown, Northborough, MA (US)

(73) Assignee: GSI Group Corporation, Billerica, MA (US)

( * ) Notice: Subject to any disclaimer, the term of this patent is extended or adjusted under 35 U.S.C. 154(b) by 193 days.

(21) Appl. No.: 10/931,443

(22) Filed: Sep. 1, 2004

(65) Prior Publication Data

US 2005/0062353 A1   Mar. 24, 2005

Related U.S. Application Data

(60) Provisional application No. 60/500,909, filed on Sep. 5, 2003.

(51) Int. Cl.
   H02K 21/12   (2006.01)
(52) U.S. Cl. ............... 310/156.11; 310/156.28; 310/156.29; 310/156.31
(58) Field of Classification Search ........ 310/156.01, 310/156.08, 156.09, 156.11, 156.28, 156.29, 310/156.31
   See application file for complete search history.

(56) References Cited

U.S. PATENT DOCUMENTS

| | | | |
|---|---|---|---|
| 1,115,729 A | 11/1914 | Ostenberg | |
| 3,216,226 A | 11/1965 | Alger et al. | |
| 3,217,192 A | 11/1965 | Feightner | |
| 3,221,191 A | 11/1965 | Cuches et al. | |
| 3,242,459 A | 3/1966 | McCollum | |
| 3,411,450 A * | 11/1968 | Clifton | 417/420 |
| 3,732,553 A | 5/1973 | Hardway, Jr. | |
| 3,889,139 A | 6/1975 | Hughes | |
| 4,100,392 A * | 7/1978 | Dron et al. | 219/121.14 |
| 4,142,144 A | 2/1979 | Rohr | |
| 4,177,395 A | 12/1979 | HoRe | |
| 4,364,000 A | 12/1982 | Burke, Jr. | |
| 4,439,699 A | 3/1984 | Brende et al. | |
| 4,642,496 A | 2/1987 | Kerviel et al. | |
| 4,667,123 A | 5/1987 | Denk et al. | |
| 4,694,235 A | 9/1987 | Flowers | |
| 4,874,215 A | 10/1989 | Montagu | |
| 4,908,816 A | 3/1990 | Champagne et al. | |
| 4,942,322 A | 7/1990 | Raybould et al. | |
| 5,220,232 A | 6/1993 | Rigney, II et al. | |
| 5,225,770 A | 7/1993 | Montagu | |

(Continued)

FOREIGN PATENT DOCUMENTS

| EP | 0523413 A2 | 1/1993 |
|---|---|---|
| EP | 0523413 A3 | 1/1993 |

(Continued)

*Primary Examiner*—Dang Le
(74) *Attorney, Agent, or Firm*—Gauthier & Connors LLP (57) ABSTRACT

A rotor is disclosed for a galvanometer system. A rotor includes a permanent magnet core, a sleeve and at least one shaft unit. The sleeve encloses and attaches to at least a portion of the permanent magnet core. The sleeve is formed of a material having a density of less than about 0.283 lb/in³. The shaft unit is attached to both the permanent magnet core and to the sleeve. An output device may be coupled to the shaft unit, and the shaft unit is formed of a material having a dynamic stiffness of at least about $1.00 \times 10^9$ lb in⁷/slug.

50 Claims, 4 Drawing Sheets

U.S. PATENT DOCUMENTS

| | | | |
|---|---|---|---|
| 5,317,579 A * | 5/1994 | Adsett | 372/35 |
| 5,424,632 A | 6/1995 | Montagu | |
| 5,936,324 A | 8/1999 | Montagu | |
| 6,041,571 A * | 3/2000 | Fields et al. | 53/331.5 |
| 6,275,319 B1 | 8/2001 | Gadhok | |
| 6,586,858 B1 | 7/2003 | Finkle | |
| 6,841,912 B2 * | 1/2005 | Yamada et al. | 310/156.28 |
| 2003/0075769 A1 | 4/2003 | Brown et al. | |

FOREIGN PATENT DOCUMENTS

| | | |
|---|---|---|
| GB | 1044695 | 10/1966 |
| GB | 2307724 A * | 6/1997 |

* cited by examiner

COMPOSITE ROTOR AND OUTPUT SHAFT FOR GALVANOMETER MOTOR AND METHOD OF MANUFACTURE THEREOF

PRIORITY

This application claims priority to U.S. Provisional Patent Application Ser. No. 60/500,909 filed Sep. 5, 2003.

BACKGROUND

The invention relates to limited rotation motors such as galvanometers, and particularly relates to limited rotation torque motors used to drive optical elements such as mirrors for the purpose of guiding light beams in scanners.

Limited rotation torque motors generally include stepper motors and galvanometer motors. Certain stepper motors are well suited for applications requiring high speed and high duty cycle saw-tooth scanning at large scan angles. For example, U.S. Pat. No. 6,275,319 discloses an optical scanning device for raster scanning applications.

Limited rotation torque motors for certain applications, however, require the rotor to move between two positions with a precise and constant velocity rather than by stepping and settling in a saw-tooth fashion. Such applications require that the time needed to reach the constant velocity be as short as possible and that the amount of error in the achieved velocity be as small as possible.

Galvanometer motors generally provide a higher torque constant and typically include a rotor and drive circuitry for causing the rotor to oscillate about a central axis, as well as a position transducer, e.g., a tachometer or a position sensor, and a feedback circuit coupled to the transducer that permits the rotor to be driven by the drive circuitry responsive to an input signal and a feedback signal. For example, U.S. Pat. No. 5,424,632 discloses a conventional two-pole galvanometer motor that includes a sleeve formed of stainless steel or titanium.

Figure 1:
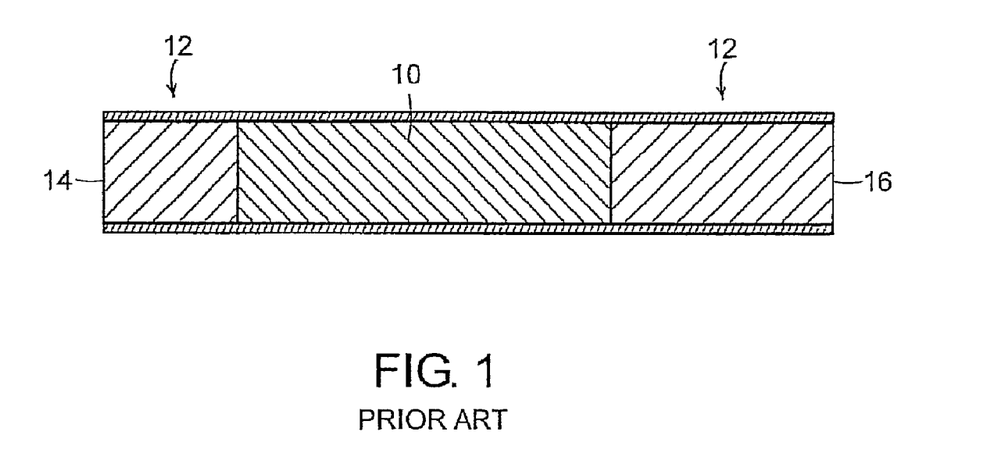
FIG. 1 shows an illustrative diagrammatic side sectional view of a rotor and output shaft in accordance with the prior art.

FIG. 1 shows a conventional moving magnet galvanometer rotor that includes a magnet 10 surrounded by a brass tube 12, with stainless steel shaft stubs 14 and 16 at each end to couple the load and feed back respectively, and to provide journals for the supportive bearings. This rotor may be used, for example, in a galvanometer scanner that displays a first resonance at 7.5 kHz, and a small-step response time of 600 microseconds to a position error of 1% of command. The dense stainless steel and brass component parts of the rotor may be chosen to achieve simple solderability (if the parts are held together with lead-based solder), high stiffness, moderate damping, and low inertia.

A requirement of a limited rotation torque motor for certain applications (e.g., galvanometer scanner servo system) may be a system capable of changing the angular position of a load such as a mirror from an angle A to an angle B, wherein angles A and B are both within the range of angular motion of the galvanometer scanner, and are both defined arbitrarily precisely. The change in angular position should occur in an arbitrarily short time while maintaining a desired linearity of velocity within an arbitrarily small error. Both the minimum time of response of this system and the minimum velocity error are determined by the effective gain-bandwidth of the system. The gain-bandwidth of the system is the concatenation of the servo amplifier gain-bandwidth with that of the galvanometer scanner.

There are applications in which it is desirable to have greater torque than may be provided by conventional limited rotation torque motors. There is a need therefore, for limited rotation torque motors that provide improved flux density without adversely affecting the performance of the motor.

SUMMARY

The invention provides a rotor for a galvanometer system, and in accordance with an embodiment, the rotor includes a permanent magnet core, a sleeve and at least one shaft unit. The sleeve encloses and attaches to at least a portion of the permanent magnet core. The sleeve is formed of a material having a density of less than about 0.283 lb/in$^3$. The shaft unit is attached to both the permanent magnet core and to the sleeve. An output device may be coupled to the shaft unit, and the shaft unit is formed of a material having a dynamic stiffness of at least about $1.00 \times 10^9$ lb in$^7$/slug.

In accordance with another embodiment, the rotor further includes a coupling unit attached to the shaft unit such that the output device may be coupled to the shaft unit via the coupling unit. The coupling unit is formed of a material having a dynamic stiffness of at least about $1.00 \times 10^9$ lb in$^7$/slug.

In accordance with another embodiment, the sleeve is being formed of a material having a density of less than about 0.283 lb/in$^3$, and the shaft unit is formed of a material having a modulus of elasticity of at least about $31 \times 10^6$ psi.

In accordance with another embodiment, the invention provides a method of forming a rotor for a galvanometer. The method includes the steps of joining a permanent magnet core to an outer sleeve and to at least one end coupling unit using a solder, and actively cooling the permanent magnet core, the outer sleeve and the at least one end coupling unit with a coolant.

In accordance with another embodiment, the invention provides another method of forming a rotor for a galvanometer including the steps of machining an end coupling unit that is formed of a material having dynamic stiffness of at least $1.00 \times 10^9$ lb in$^7$/slug, and actively cooling the end coupling unit with a coolant.

BRIEF DESCRIPTION OF THE ILLUSTRATED EMBODIMENTS

The following detailed description may be further understood with reference to the accompanying drawings in which.

The drawings are shown for illustrative purposes only.

DETAILED DESCRIPTION OF THE ILLUSTRATED EMBODIMENTS

An important requirement in the design of a servo system is the ability to respond quickly to a change in commanded velocity or position with high precision. In order to meet this requirement, servo motors are generally designed to have large torque constants and relatively large absolute torque capability so that the parasitic inertia of the motor itself and the added inertia of the load element may be accelerated quickly. The torque is proportional to the number of Ampere-turns in the field winding until either field saturation occurs or the motor fails from over heating (all other design elements remaining the same). As a result, these motors have a large number of turns in the field winding, and are capable of carrying large currents, because the figure of merit, ampere-turns, is the product of the number of turns in the field and the current flowing through the field. A wide variety of turns-current combinations may be selected to achieve the desired product of the two. In practice, however, the emphasis of either of these elements over the other results in system difficulties. If the current is maximized, then the heating of the winding contributes to system performance limitations, because the heating is proportional to the square of the current flowing through the winding. If, on the other hand, the number of turns is emphasized, then the inductance of the winding requires very large voltages to produce the required change in current per unit time. Applicant has discovered that overall system improvement may be achieved by increasing the gain-bandwidth product of the galvanometer in accordance with various embodiments of the invention.

As mentioned above, an important requirement of a galvanometer scanner is torque output. In this context, field saturation is a possible performance limiter. In fact, modern servo amplifiers are capable of supplying sufficient current to the stator winding that the field, e.g., as provided by a permanent magnet in the rotor, is de-magnetized by the reverse magnetic field developed by the ampere-turns of the winding. In this case, the torque of the motor cannot be increased further, and the performance of the system is limited by this torque, as it is in the case of Ohmic over heating. In addition, the coupling between the motor and the feedback mechanics, which are typically internal and to a greater or lesser degree integral with the motor, must be stiff enough to allow the required bandwidth. There is, however, more to the coupling than stiffness. The first torsional resonance effectively defines the upper limit of the bandwidth. In general, it is not enough that the first torsional resonance be at a higher frequency than some number, it is also desirable that the mechanical Q of the resonance be as small as possible.

The over-all system gain bandwidth product of prior art systems is generally limited by the performance of the motor, not the servo amplifier. The motor is either limited by torsional resonance or by the torque that it can produce.

More precisely, however, it is the torque-to-inertia ratio of the motor-load system that limits performance when the torque is maximized. In other words, if the inertia of the moving parts of the system can be reduced, the performance may be improved in spite of the torque limit as long as the bandwidth and damping (inverse of Q) are maintained or improved.

Figure 2:
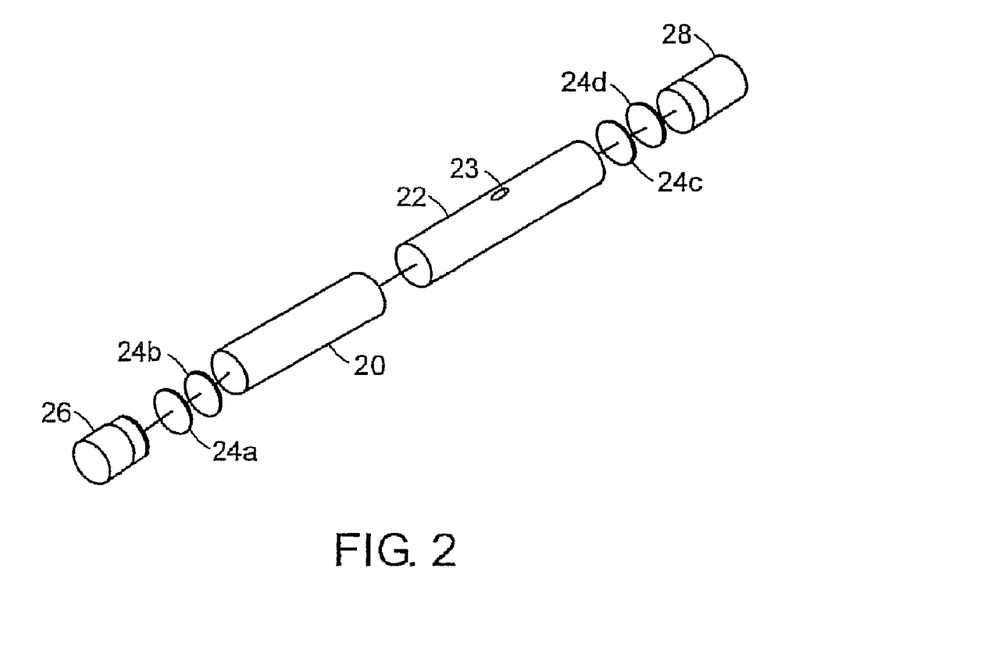
FIG. 2 shows an illustrative diagrammatic exploded isometric view of a rotor and output shaft in accordance with an embodiment of the invention.

FIG. 2 shows an embodiment of the invention that includes a magnet 20, a sleeve 22, solder discs 24a, 24b, 24c and 24d, and shaft units 26 and 28. This design provides that the dense stainless steel and brass components of the rotor of FIG. 1 are replaced with titanium or other low density, high stiffness material such as silicon nitride, silicon carbide, titanium nitride, boron carbide and others to reduce the inertia. The design also provides that the integral load-end shaft of the prior art is replaced by a two-part output shaft, the majority being low-inertia material, but the actual load-carrying part is stainless steel or other desirable high-stiffness material. As an example, titanium has desirable low inertia, and desirable damping qualities, but it has a low modulus of elasticity. The combination output shaft capitalizes on the damping and low inertia of the titanium, while the stainless steel core adds the required stiffness. On the other hand, a rotor constructed of a metalo-ceramic material may need an output shaft insert at both ends in order to provide suitable attachments for the load and feedback mechanism. A resulting rotor, for example may be used in a galvanometer scanner system of the prior art using the same servo amplifier as the prior art with a certain arbitrary load. Such a rotor however, may provide a galvanometer that displays a first torsional resonance at 7 kHz, and a small-step response time of 200 microseconds to a position error of 1% of command with the same arbitrary load. This rotor provides improved over-all system performance by a factor of 3 without increasing the demands on the servo amplifier, or requiring more torque from the motor.

While the use of the above materials is desirable, the construction of a suitable rotor with the materials presents several impediments that must be overcome. In general, the first set of difficulties has to do with solderability, while the second has to do with processing of the titanium or other difficult-to-machine materials such as titanium carbide, boron carbide, and other suitable low density, high stiffness materials. The table below lists some structural material candidates in decreasing order of dynamic stiffness (defined as modulus of elasticity divided by density cubed). Dynamic stiffness (DS) is the metric that best specifies the material that permits a part made from it to display minimum inertia for a defined resonant frequency, or conversely, a maximum resonant frequency for a defined inertia. Of course, there are usually competing requirements for properties, such as malleability, solderability etc. The present invention facilitates choosing the most appropriate set of properties for each part of the rotor. The sleeve and the end coupling unit(s) each preferably have a dynamic stiffness of at least $1 \times 10^9$.

TABLE I

| Material | Young's Modulus | | Density | | DS | DS |
|---|---|---|---|---|---|---|
| | lb/in2 | Pa | lb/in$^3$ | g/cc | lb in$^7$/slug | Normalized |
| Beryllium | 46.1E+6 | 317.9E+9 | 0.0667 | 1.846 | 5.05E+10 | 1.000 |
| Boron | 64.0E+6 | 441.3E+9 | 0.0800 | 2.214 | 4.07E+10 | 0.805 |
| Carbon-Carbon | 29.0E+6 | 200.0E+9 | 0.0650 | 1.799 | 3.43E+10 | 0.680 |
| Boron Carbide | 65.0E+6 | 448.2E+9 | 0.0910 | 2.518 | 2.81E+10 | 0.555 |

TABLE I-continued

| Material | Young's Modulus lb/in2 | Young's Modulus Pa | Density lb/in³ | Density g/cc | DS lb in⁷/slug | DS Normalized |
|---|---|---|---|---|---|---|
| Diamond | 153.0E+6 | 1.1E+12 | 0.1268 | 3.509 | 2.44E+10 | 0.483 |
| AlBeMet | 29.0E+6 | 200.0E+9 | 0.0760 | 2.103 | 2.15E+10 | 0.425 |
| Silicon Nitride | 31.0E+6 | 214.0E+9 | 0.115 | 3.183 | 2.00E+10 | 0.396 |
| Beryllia (BeO) | 5.80E+07 | 399.9E+9 | 0.1000 | 2.768 | 1.89E+10 | 0.373 |
| Silicon Carbide (Single Crystal) | 68.0E+6 | 468.9E+9 | 0.1160 | 3.210 | 1.42E+10 | 0.280 |
| SuperSiC (Poco) Avg | 32.0E+6 | 220.6E+9 | 0.0920 | 2.546 | 1.34E+10 | 0.265 |
| Titanium Nitride | 87.0E+6 | 600E+9 | 0.189 | 5.220 | 1.29E+10 | 0.265 |
| Silicon Carbide (Refel F - TenMat) | 55.8E+6 | 384.7E+9 | 0.1115 | 3.086 | 1.31E+10 | 0.259 |
| SiC Trex CVD | 62.3E+6 | 429.6E+9 | 0.1160 | 3.210 | 1.30E+10 | 0.257 |
| Al/B4C (MMCC) | 28.0E+6 | 193.1E+9 | 0.0940 | 2.601 | 1.10E+10 | 0.217 |
| Boron Nitride | 11.0E+6 | 75.8E+9 | 0.0700 | 1.937 | 1.04E+10 | 0.206 |
| Silicon | 16.4E+6 | 113.1E+9 | 0.0843 | 2.333 | 8.90E+09 | 0.176 |
| Magnesium | 6.5E+6 | 44.7E+9 | 0.0620 | 1.716 | 8.84E+09 | 0.175 |
| Zerodur | 13.2E+6 | 91.0E+9 | 0.0790 | 2.186 | 8.71E+09 | 0.172 |
| Fused Silica | 10.8E+6 | 74.5E+9 | 0.0795 | 2.200 | 6.99E+09 | 0.138 |
| Alumina | 57.0E+6 | 393.0E+9 | 0.1440 | 3.985 | 6.21E+09 | 0.123 |
| Macor Ceramic | 9.3E+6 | 64.1E+9 | 0.0910 | 2.518 | 4.01E+09 | 0.080 |
| Titanium Carbide | 65.0E+6 | 448.2E+9 | 0.1780 | 4.926 | 3.75E+09 | 0.074 |
| Aluminum | 10.0E+6 | 69.0E+9 | 0.0975 | 2.698 | 3.51E+09 | 0.069 |
| Titanium | 17.4E+6 | 119.9E+9 | 0.1640 | 4.539 | 1.28E+09 | 0.025 |
| Zirconia | 30.0E+6 | 206.9E+9 | 0.2200 | 6.089 | 9.16E+08 | 0.018 |
| 01 Steel | 31.0E+6 | 213.7E+9 | 0.2830 | 7.832 | 4.45E+08 | 0.009 |
| 300 Stainless | 29.0E+6 | 200.0E+9 | 0.2830 | 7.832 | 4.16E+08 | 0.008 |
| UHS Steel (MP35N) | 34.1E+6 | 235.1E+9 | 0.3040 | 8.413 | 3.95E+08 | 0.008 |
| Neodymium | 21.7E+6 | 149.6E+9 | 0.2760 | 7.638 | 3.36E+08 | 0.007 |
| Nickel | 30.0E+6 | 206.9E+9 | 0.3216 | 8.900 | 2.93E+08 | 0.006 |
| Brass | 15.0E+6 | 103.4E+9 | 0.3060 | 8.469 | 1.70E+08 | 0.003 |
| Tungsten Carbide | 94.8E+6 | 653.6E+9 | 0.6200 | 17.159 | 1.29E+08 | 0.003 |
| Tungsten | 59.6E+6 | 410.9E+9 | 0.6970 | 19.290 | 5.73E+07 | 0.001 |

The Young's modulus is shown in pounds per square inch (psi) and in Pascals (Pa), and the density is shown in pounds per cubic inch (lb/ci) and in grams per cubic centimeter (g/cc).

It is useful to consider what the rotor must achieve to understand the critical nature of these concerns in a practical embodiment. In the abstract, the rotor is a magnet. The more magnet, the better performance. The reason, however, why it is not practical in many applications to form a rotor entirely from a magnet (such as by grinding) involves several considerations, other than the fact that only the part of the magnet surrounded by the stator coil produces torque.

First, the most desirable magnet materials have no resistance to atmospheric corrosion, and so would gradually be destroyed by contact with air during use, since it is not practical to seal the galvanometer against air. Even if one did so, the attachment between the output shaft and the load, the driving of which is, after all, the object of the exercise, would generally be in air, and so the shaft would corrode. To solve this problem, one might coat the outside of the magnetic material with a suitably corrosion resistant material, and in fact this is often done with magnets exposed to air. However, the thickness of this coating takes the place of the desirable magnetic material if the rotor envelop remains the same, and so tends to defeat the purpose of maximizing the magnetic content of the rotor. Also, some traditional coating materials, such as nickel plating, have a density even greater than that of the magnetic material, so tend to increase the inertia of the rotor, particularly since these materials are at the largest radius of the rotor by definition. Thus the torque-to-inertia ratio is reduced.

Second, the magnetic materials under consideration display strong isotropy in coefficient of thermal expansion. The result is that the cylindrical form of the rotor is increasingly deformed into an oval under the influence of temperature change, the material expanding strongly in one orthogonal cross-axis direction, and 80 times less in the other. As a result, the portion of the magnet that extends through and is supported by the rotor bearings will distort these bearings, causing them to loose their accuracy and, in the limit, to be destroyed.

Third, extending the magnetic material into and through the bearings causes a strong magnetic field to pass through the bearings. As a practical matter, these bearings are ball bearings constructed usually of type 440C stainless steel or type 52100 carbon steel, both of which are magnetic, and can be permanently magnetized. If magnetized, the poles induced into the rings and into the balls, if they are also made of steel, produce a saliency or torque when one attempts to change their positions relative to each other, as is the case when the rotor rotates. This torque is variable with rotor angle, and becomes a source of additional undesirable signals at the servo amplifier input. In the limit, this magnetic saliency places a bound on the precision in velocity linearity and position accuracy which the system is able to achieve.

Fourth and lastly, the magnetic material is extremely brittle and hard. As a result, it is impractical to provide the attachment features, such as tapped holes, required to mount the load and the feedback systems respectively to the ends of the rotor. In fact, the brittleness of the magnetic material is so extreme that many manufactures of this material caution strongly against transmitting mechanical forces of any kind, including torques, through the material itself.

The objective, therefore, is to overcome these difficulties, while preserving the maximum magnet content of the rotor in the region where the magnetic field interacts with the stator coils, minimizing the field through the bearings, minimizing the distortion of the bearings, maximizing the torque-to-inertia ratio of the rotor, and providing stiff attachments for the load and feedback.

Galvanometer output shafts in accordance with various embodiments of the invention satisfy certain of these objectives. In the design shown in FIG. 2, the magnet is hermetically sealed inside the tubular section of the rotor when assembled as further shown in FIG. 3. The volume of solder contained in the solder discs 24a-24d is determined to be sufficient to fully coat the magnet 20 within the sleeve 22 such that a small amount of extra solder is produced through a small hole 23 in the sleeve 22. As a result, the magnet requires no further corrosion protection. Prior designs applied unnecessarily thick plating carried over from traditional corrosion-protective plating processes for the purpose of making the magnet solderable. As a result, the magnet volume was undesirably and unnecessarily reduced below the optimum. The current design specifies a solderable magnet coating, found through experiment, of nickel or copper, which is the minimum thickness respectively required to prevent the entire coating thickness from dissolving in the solder during the soldering assembly step. Of course, if all the coating dissolved, the magnet would not be metallurgicaly attached to the resulting embedment. During thermal cycling, the magnet would become loose, and could not transmit the torque to the tube. Previous developments used nickel plating as much as fifteen times greater in thickness. A typical specification for the optimum solderable film thickness is 0.0002+/−0.0001 inches when using 63% lead/37% tin eutectic solder at a temperature of 225° C. and a heating time of 6.2 seconds.

As far as corrosion of the rotor itself is concerned, the substitution of titanium for brass has the added benefit of providing corrosion protection for the rotor in industrial environments where brass is susceptible to degradation.

Figure 3:
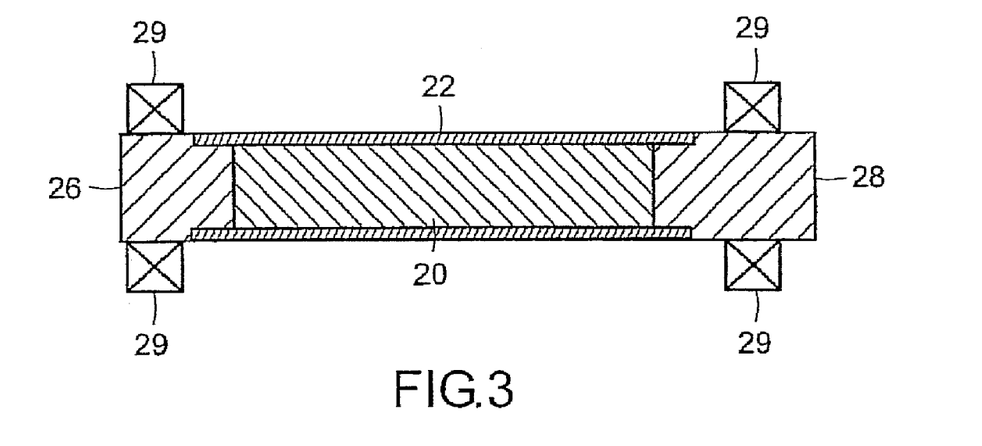
FIG. 3 shows an illustrative diagrammatic side sectional view of the rotor and output shaft of FIG. 2.

As also shown in FIG. 3, the shaft units 26 and 28 provide the rotor interface with the bearings 29. The bearing surface of the rotor, therefore, may have a desired stiffness or modulus of elasticity that is different than that of the sleeve 22. An output device such as a mirror is typically mounted on one of the shaft units. In further embodiments, an output device may be indirectly mounted on a shaft unit via a coupling unit, and the coupling unit may be chosen to provide stiffness or a modulus of elasticity that is further different than the sleeve and/or the shaft unit as discussed below with reference to FIG. 5.

In certain embodiments, the shaft unit 28 of the rotor of FIG. 3 may be coupled to an output device that fits over the exposed end of the shaft end 28, and the shaft end 28 may have a reduced diameter in the area of this coupling. This permits a material to be chosen for the shaft end that provides a desired stiffness or damping quality, yet another material to be chosen for the output device or an intermediate coupling unit as discussed below. The invention provides that a wide variety of factors may be considered and maximized in the design of a rotor. Stiffness is defined by Young's modulus (psi), specific stiffness is defined by Young's modulus divided by density (inches), dynamic stiffness if defined by Young's modulus divided by density$^3$ (lb inch$^7$/slug, where one slug=32.2. lb force); and damping is the inverse of stiffness (a material with a very high stiffness provides low damping). Although it is generally desirable that a rotor be formed of materials with high stiffness, a certain amount of damping, may be desirable in some applications.

The invention provides that a material with high stiffness (and high dynamic stiffness) may be used adjacent the rotor bearings, while the remaining portions of the rotor may be chosen to provide a desired amount of damping. By plating certain materials such as silicon carbide, beryllium, boron carbide, boron nitride, diamond, ceramic and Aluminum Beryllium Metal (AlBeMet™ aluminum (70%) and beryllium (30%) alloy) as sold by Brush-Wellman, Inc. of Cleveland, Ohio, many materials may be employed to provide desired stiffness or inertia. The coupling unit may further be chosen to provide desired stiffness and desired inertia depending on its diameter.

Figure 4:
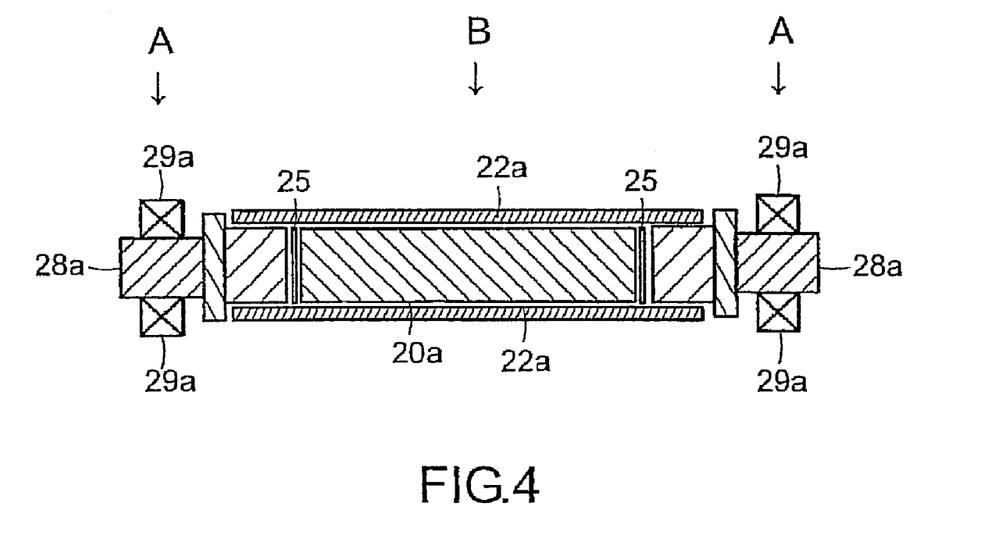
FIG. 4 shows an illustrative diagrammatic side sectional view of a rotor and output shaft similar to the view shown in FIG. 3 in accordance with a further embodiment of the invention.

A rotor and output shaft in accordance with another embodiment of the invention is shown in FIG. 4 (shown prior to the application of heat). In particular, FIG. 4 shows a permanent magnet 201 that is enclosed within a sleeve 22a having a low density and high stiffness. The shaft includes shaft units 28a and 28b as shown at A that are formed of a material having a low inertia compared to the magnet, which is shown at B. Solder discs 25 are shown within the rotor and output shaft prior to the application of heat. As discussed above, under the application of heat, the solder flows and fills the space between the magnet and the sleeve and shaft units. The output shaft shown in FIG. 4 also includes regions of reduced diameter again as shown at A in the area of the bearings 29a compared to the region shown at B. The reduction in thickness and the proper choice of material for the shaft units 28a may provide a desirably low density yet high stiffness.

Since the magnet does not pass through the bearings, its anisotropic thermal expansion does not cause them any harm. However, it continues to respond to temperature change by becoming oval in cross-section. Failure to take this effect sufficiently into consideration may result in the complex bonding layer that separates the magnet from the walls of the tube not being able to accommodate the expansion without cracking or breaking, resulting in damage to the magnet or to looseness. In particular, brass and stainless steel have coefficients of thermal expansion near 10, while titanium has a coefficient of thermal expansion of 6. The large coefficient of thermal expansion of neodymium-iron-boron magnets is about 8. As a result, the earlier designs put the bonding layer in tension, exacerbating the cracking, while titanium puts the layer in compression during temperature increase above room temperature, the usual case.

Titanium, like the magnet, and in contrast with brass, is not wetted by solder, and so is not directly solderable. It is also difficult to plate. It has been necessary to develop an electro-less nickel plating process to make the titanium parts solderable. Previous work has been unable to control the dimensional tolerance stack-up among the concentric parts and the intermediate bonding layer, and so, to assure that the parts would assemble in the maximum material condition, were forced to deal with a relatively large gap between the mating parts during assembly. This gap was dealt with by adding large quantities of solder in wire form through holes in the tube during the soldering operation. As one result, it was not possible to make the magnet and tube concentric. As another, the gap between the tube and magnet was so large as to prevent capillary action from being effective in pulling solder throughout the annulus, resulting in voids between the magnet and tube. These effects led to an imbalance in the rotor, to increases in inertia and concomitant decreases in torque, and thereby provide a sub-optimal torque to inertia ratio.

In accordance with various embodiments of the present invention, the tolerances on the thicknesses of the plating layers are carefully controlled by carefully developed plating and grinding specifications so as to assure assembly in the maximum material condition while minimizing the gap in the minimum material condition. This results in the minimum difference in diameter between the outside of the magnet and the outside of the rotor consistent with the transmission of the required torque and the required stiffness of the assembly. In other words, the magnet volume is maximized. This is achieved by applying most of the solder in a plated film on the inside of the tube and on the outside of the magnet and rotor end caps. A small additional quantity of solder is supplied in the form of a loose disc assembled between each end cap and the magnet during assembly, which solder volume is only a small percentage of the total, and is required only to fill the gap resulting from the tolerance on the part diameters, rather than the entire volume of the solder layer as in previous designs. A typical specification for the thickness of the finished solder film achievable by this technique is 0.0005"+/−0.0002", compared with the previous art which was 10 times this size. Thus the magnet is centered 10 times as well, the joint is fully filled, the magnet diameter is maximized, the joint is in compression during heating, and the stiffness of the assembly is maximized.

The solder may comprise tin (92%-96%), silver (3%-7%) and copper (0.1%-3%). In a preferred embodiment, the solder comprises 93.5% tin, 3% silver, and 0.5% copper. The use of a solder that does not include lead is believed to contribute to increased stiffness. The above preferred solder is believed to provide very high stiffness without contributing negatively to over-heating of the magnet.

Figure 5:
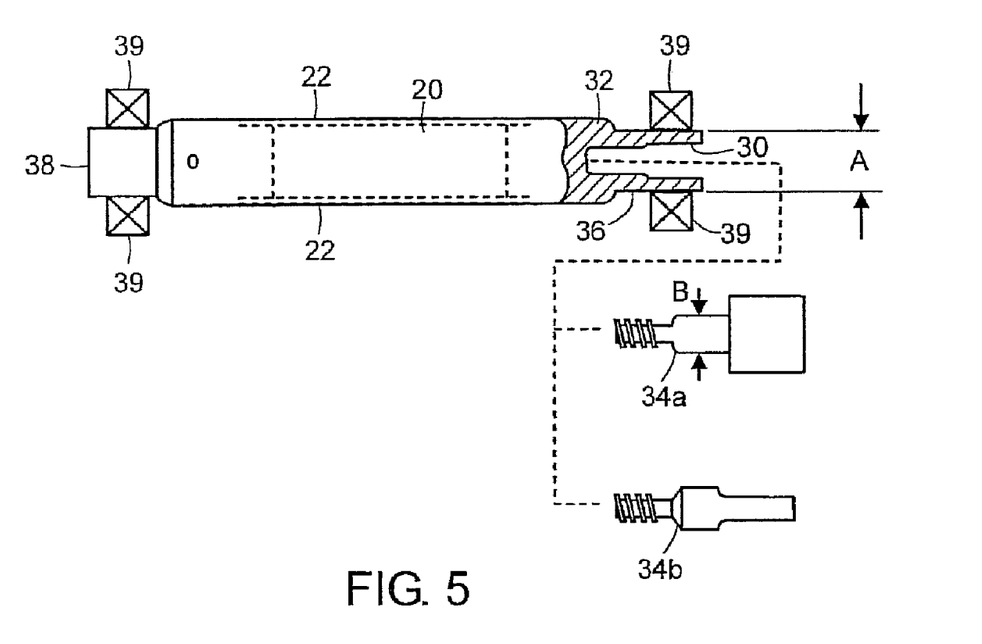
FIG. 5 shows an illustrative diagrammatic side partial sectional view of a rotor and output shaft of another embodiment of the invention.

It is desirable in certain embodiments to attach a coupling device onto the end of a rotor shaft for attaching an optical device such as a mirror onto the shaft. For example, as shown in FIG. 5, a tapped hole 30 may be introduced into one end of a rotor shaft unit 32 for receiving a threaded mirror coupling device 34*a* or 34*b*. The coupling devices 34*a* and 34*b* provide that the load (e.g., a mirror) may be attached to the shaft using a material other than that used to form the shaft. The invention provides therefore, that a low inertia shaft formed of a material such as titanium may be used with a high stiffness coupling device formed of a material such as beryllium in accordance with an embodiment.

The output shaft shown in FIG. 5 includes regions of reduced diameter 36 and 38 in the area of the bearings 39. Again, the reduction in thickness and the proper choice of material for the shaft units 28*a* may provide a desirably low density yet high stiffness. Moreover, the shaft unit 36 may is partially formed of the coupling unit 34*a* or 34*b*, which may also be chosen to provide a desirably high stiffness for coupling to an output device such as a mirror. In particular, while the reduced radius section of the shaft end may have an outer diameter of A as shown, a portion of the shaft adjacent the bearings 29 is also formed of the coupling unit (e.g., 34*a*) having an outer diameter B as shown. Each of the materials, therefore, may be chosen to provide optimally low inertia and high stiffness as required for various applications.

FIGS. 2 and 3 show sequential stages of construction of a rotor with output shafts 28. FIG. 4 is a slightly exploded sectional view of the rotor with the shafts 28*a* and 28*b* shown finished, with the rotor ready for use. The shafts themselves are of monolithic construction. FIG. 5, in contrast, shows a two-part output shaft on one end of the rotor. This two-part construction, conceived to allow interchangeable mounting diameters for mirrors of different sizes, has both parts made of the same material, typically stainless steel. It is in fact part 34*a* or 34*b* that is principally responsible for transmitting the torque from the magnet to the load. As such, it is the part that requires highest possible stiffness consistent with low inertia. Prior workers failed to recognize that since it is a separable part, it would be possible and in fact practical to make it of a low inertia, high stiffness material whose other properties, such as machinability or malleability, would prevent economic use for part 32, which must be conjoined with the magnet, and which passes through and is supported by the bearing. The invention makes it possible to substitute a material such as beryllium, boron, carbon-carbon, albemet, beryllia, silicon carbide, boron carbide and others in decreasing order of desirability for the material in the center of the shaft unit 32, and thereby increase the stiffness of the coupling between the magnet and the load while decreasing the system inertia. In addition, the desirable property of ready interchangeability could be retained if desired. Of course, if for some reason it was desirable in a particular application to decrease the stiffness of the coupling between the magnet and the load, or to provide a damped coupling, or a combination of these, the composite output shaft concept provides the ability to do so. The use of magnesium for parts 34*a* and/or 34*b* for example, would achieve damped low stiffness coupling.

Titanium is a notoriously difficult material to machine, as are the other candidate materials for construction of improved rotors. As a result, it has been found necessary to build fixturing to support the tube caps during machining to avoid transmitting the machining torque through the solder joints. Also, since titanium work-hardens during machining, it is important to develop a set of spindle speed/feed rate tables for each machining operation so that the threaded mounting holes could be tapped. A special molybdenum disulfide-based lubricant was developed for tapping. Similar development was required to determine a through-feed grinding process which would bring the rotor outside diameter to size without damaging the solder joints through a combination of over-heating and mechanical stress.

The melting temperature (liquidus) for the solder suitable for use in an embodiment is about 185° C. The measured peak temperature of the magnet just above the lip of the cap during this process is about 202° C. A temperature gradient, positive in the direction of desired solder flow, is required for the success of any soldering operation.

The rotor soldering process may involve a series of steps as follows. First, pour a quantity of flux into a flux tray to a depth of 3/16 inch (5 mm). Note that the alcohol solvent in the flux evaporates quickly. Periodically add a small amount of ethyl alcohol from the squirt bottle to prevent the flux from becoming sticky. If necessary to maintain flux depth, add fresh flux.

Next, assemble a solder pre-form into each cap, using a magnet to seat the preform solidly in the bottom of the cap. Stand a magnet one end briefly in the flux tray, then insert it into a cap, using a rotary motion to spread the flux evenly. Place a second cap on the other end of the magnet, using no flux. Place the rotor assembly in the soldering fixture, fluxed end down. Close a clamp, making sure that both caps are inside their respective alignment bushings. Press briefly on a heating switch. When a 3.6 second heating cycle ends, cool the heated end of the rotor with approximately 1 second of alcohol spray. Open the clamp, remove the rotor, remove the top cap, flux the magnet end, replace the cap, and repeat the above steps from closing the clamp through cooling with the alcohol spray inclusive.

The speeds and feed for machining titanium rotors in accordance with an embodiment in which heat is reduced as much as possible are as follows. Use Gurhing drills, and a flood of Blaser water-soluble coolant. For drilling the tap hole, use a #38 (0.1015 dia) drill. Tap the hole with a thread-forming tap in a self-reversing tapping head (Tapmatic preferred). During drilling and tapping, use a spindle speed of 270 RPM and a feed rate of ¼ ipm. Use a high-pressure lubricant during tapping. During reaming, use a spindle speed of 500 rpm and a feed of ⅜ ipm. Turning is not a problem with a sharp single-point carbide tool, at standard spindle speed and feeds. However, a flood of water-based coolant must be used. All lathe operations must be completed before grinding of the journals. During these operations, the blank must be supported in a bushing relieved internally for the full length of the unsupported tubular section of the rotor. The end plugs should be supported for their full un-reduced length in the bushing, including the length inside the tube. The production bushing should be made of hardened steel. A bar of ¾×⅜ A1 may be used. In general, the transmission of torques through the solder joints must be avoided.

Grinding recommendations for forming rotors of various embodiments of the invention are as follows. During through-feed grinding, the rough and finish wheel feed per pass should be limited to 0.001 inches to avoid work-hardening of the surface, over-heating, and torqueing the solder joints. During grinding between centers, extreme care must be exercised to avoid over heating and excessive drive torque, since this operation by its nature requires driving through the solder joints.

Recommendations for drilling the cross hole in various embodiments are as follows. The cross hole should be drilled before grinding, using the part zero reference as a location surface. The drawing has been re-dimensioned to make this possible. Also, the depth of the hole has been changed to prevent break-through into the tap drill hole. The blank must be supported in the lathe-operation relieved bushing for this operation.

Recommendations for torque testing are as follows. A torque tester similar to the one built for qualifying the solder joints should be constructed to support the finished rotor for the required 100% 15 in-lb torque test. Instead of chucks, however, the rotor ends will require collet clamps to prevent damage to the journal surfaces.

These recommendations are intended to minimize stress on the solder joints, prevent side-loading of the rotor ends with respect to the torque tube or to each other, and minimize heating and work-hardening of the finished surfaces.

Important contributions provided by certain embodiments of the invention include: an improved permanent magnet galvanometer rotor with Titanium shafts and/or torque tube; and an improved permanent magnet galvanometer rotor with a composite output (load) shaft.

Figure 6:
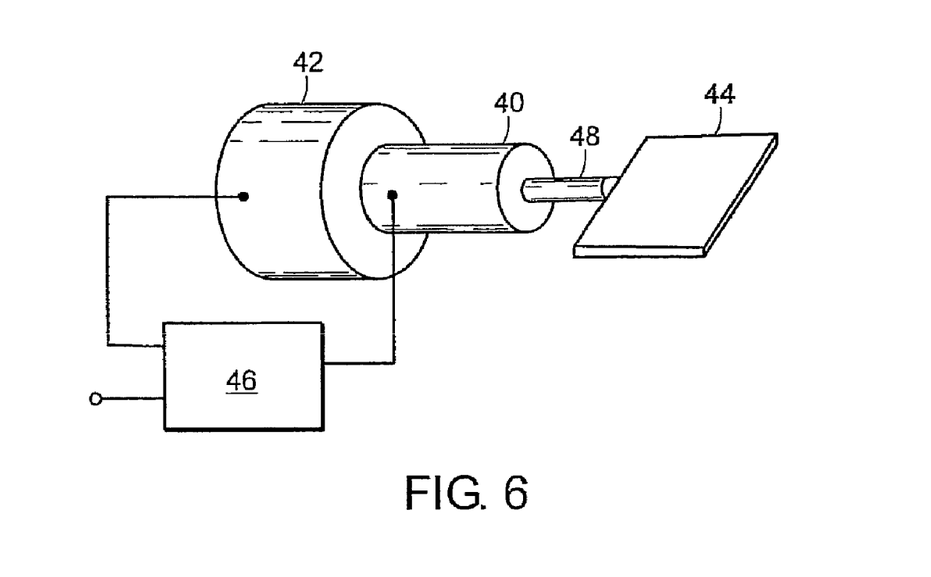
FIG. 6 shows an illustrative diagrammatic isometric view of a galvanometer system that includes the output shaft in accordance with an embodiment of the invention.

As shown in FIG. 6, a galvanometer scanner assembly including a rotor shaft in accordance with an embodiment of the invention may include a scanner motor 40, having a rotatable rotor with an outer sleeve 48 as discussed above, with transducer 42 for monitoring the position of the rotor attached to one end of the rotor and a scanning element 44, which may comprise a mirror, attached to the output shaft of the scanner motor 40 at an opposite end from the position transducer. Of course, the scanning element 44 and the position transducer 42 may each be attached to the rotor at the same end thereof. The system also includes a feedback control system 46 that is coupled to the transducer 42 and the motor 40 as shown to control the speed and/or position of the motor.

Figure 7:
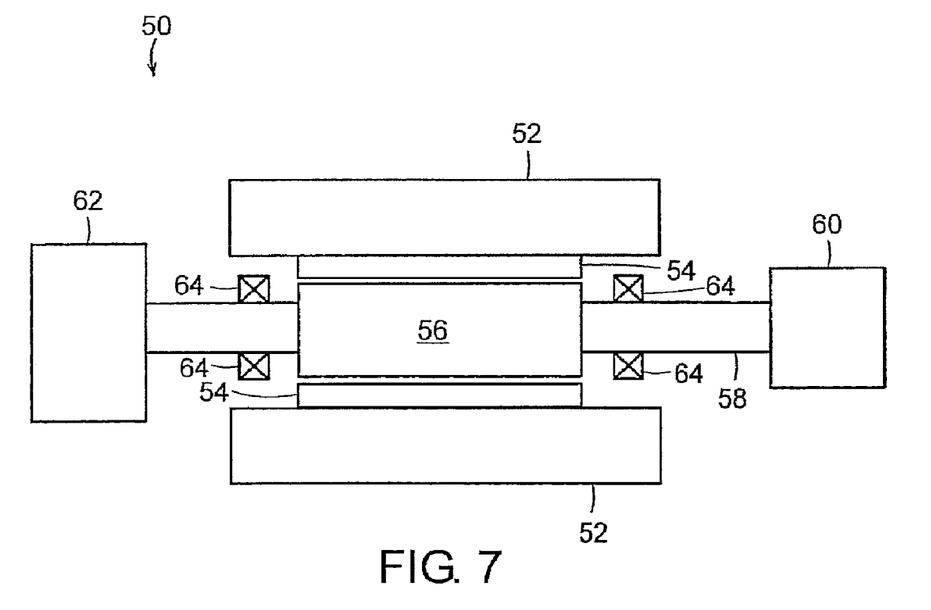
FIGS. 7 and 8 show illustrative diagrammatic side sectional views of further galvanometer systems that include output shafts in accordance with various embodiments of the invention.

In further embodiments, a galvanometer assembly 50 including a motor in accordance with an embodiment of the invention includes a backiron 52, stator coils 54 and a magnet 56 that is secured to a shaft 58 as shown in FIG. 7. The shaft 58 is rotatably mounted to a housing structure (not shown) via bearings 64. A scanner element such as a mirror 60 is mounted to one end of the shaft 58 while a position transducer 62 is mounted to the other end of the shaft 58.

Figure 8:
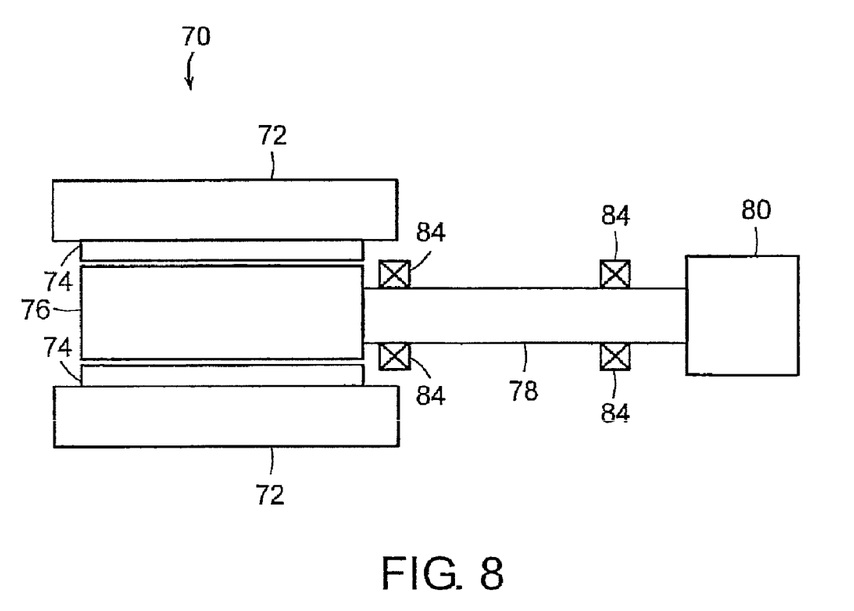

As shown in FIG. 8, a galvanomter assembly 70 in accordance with a further embodiment of the invention may include a backiron 72, stator coils 74 and a magnet 76 that is secured to a shaft 78 as discussed above. A mirror 80 is attached to the shaft and the shaft is rotatably secured to a housing structure (not shown) via bearings 84. The galvanometer assembly 100 may further include a position transducer as discussed above.

In accordance with various embodiments therefore, the invention provides for the manufacture of a galvanometer rotor shaft that includes a low inertia material such as titanium or ceramic, and a high stiffness output device to which a load may be attached. The shaft may be formed using plating techniques to plate the magnet and low inertia materials to facilitate bonding such as by soldering. The low inertia material may be processed by maintaining a low temperature during processing such as drilling and tapping.

Those skilled in the art will appreciate that numerous modifications and variations may be made to the above disclosed embodiments without departing from the spirit and scope of the invention.

What is claimed is:

1. A rotor for a galvanometer system, said rotor comprising:
   a permanent magnet core;
   a sleeve enclosing and attached to at least a portion of said permanent magnet core, said sleeve being formed of a material having a density of less than about 0.283 lb/in$^3$; and
   at least one shaft unit that is bonded to both said permanent magnet core and to said sleeve by a solder that includes tin, silver and copper, and to which an output device may be coupled.

2. The rotor as claimed in claim 1, wherein said rotor further includes a coupling unit attached to said shaft unit such that the output device may be coupled to said shaft unit via said coupling unit, said coupling unit being formed of a material having a dynamic stiffness of at least about $1.00 \times 10^9$ lb in$^7$/slug.

3. The rotor as claimed in claim 2, wherein said shaft unit and said coupling unit are formed of different materials.

4. The rotor as claimed in claim 1, wherein said shaft unit is formed of a material that includes titanium.

5. The rotor as claimed in claim 4, wherein said sleeve is nickel plated on an inner surface thereof.

6. The rotor as claimed in claim 1, wherein said permanent magnet core, said sleeve and said shaft unit are joined to one another by solder.

7. The rotor as claimed in claim 6, wherein said solder has a thickness of less than about 0.0005 inches.

8. The rotor as claimed in claim 6, wherein said solder includes tin, silver and copper.

9. The rotor as claimed in claim 8, wherein said solder includes about 92% to about 96% tin, about 3% to about 7% silver, and about 0.1% to about 3% copper.

10. The rotor as claimed in claim 6, where said solder includes no lead.

11. The rotor as claimed in claim 1, wherein said permanent magnet core is formed of a material that has a first coefficient of thermal expansion and the sleeve is formed of a material that has a second coefficient of thermal expansion that is less than the first coefficient of thermal expansion.

12. The rotor as claimed in claim 1, wherein said permanent magnet core and said sleeve are joined together by a bonding layer that is in compression at temperatures above room temperature.

13. The rotor as claimed in claim 1, wherein said shaft unit is formed of a material that includes beryllium.

14. The rotor as claimed in claim 1, wherein a first portion of said rotor that is adjacent one or more rotor bearings is formed of a material having an inertia that is less than an inertia of a second portion of said rotor that includes said permanent magnet.

15. The rotor as claimed in claim 14, wherein said first portion of said rotor has a diameter that is less than said second portion of said rotor.

16. The rotor as claimed in claim 1, wherein said rotor is employed in a galvanometer.

17. The rotor as claimed in claim 16, wherein said galvanometer is employed in a laser marking system.

18. A rotor for a galvanometer system, said rotor comprising:
a permanent magnet core;
a sleeve enclosing and attached to at least a portion of said permanent magnet core, said sleeve being formed of a material having a density of less than about 0.283 lb/in$^3$; and
at least one shaft unit that is attached to both said permanent magnet core and to said sleeve by a solder that includes tin, silver and copper, and to which an output device may be coupled, said shaft unit being formed of a material having a modulus of elasticity of at least about 31×10$^6$ psi.

19. The rotor as claimed in claim 18, wherein said rotor further includes a coupling unit attached to said shaft unit such that the output device may be coupled to said shaft unit via said coupling unit, said coupling unit being formed of a material having a dynamic stiffness of at least about 1.00× 10$^9$ lb in$^7$/slug.

20. The rotor as claimed in claim 19, wherein said shaft unit and said coupling unit are formed of different materials.

21. The rotor as claimed in claim 18, wherein said shaft unit is formed of a material that includes titanium.

22. The rotor as claimed in claim 21, wherein said sleeve is nickel plated on an inner surface thereof.

23. The rotor as claimed in claim 18, wherein said permanent magnet core, said sleeve and said shaft unit are joined to one another by solder.

24. The rotor as claimed in claim 18, wherein said solder has a thickness of less than about 0.0005 inches.

25. The rotor as claimed in claim 18, wherein said permanent magnet core is formed of a material that has a first coefficient of thermal expansion and the sleeve is formed of a material that has a second coefficient of thermal expansion that is less than the first coefficient of thermal expansion.

26. The rotor as claimed in claim 18, wherein said permanent magnet core and said sleeve are joined together by a bonding layer that is in compression at temperatures above room temperature.

27. The rotor as claimed in claim 18, wherein said shaft unit is formed of a material that includes beryllium.

28. The rotor as claimed in claim 18, wherein a first portion of said rotor that is adjacent one or more rotor bearings is formed of a material having an inertia that is less than an inertia of a second portion of said rotor that includes said permanent magnet.

29. The rotor as claimed in claim 28, wherein said first portion of said rotor has a diameter that is less than said second portion of said rotor.

30. The rotor as claimed in claim 18, wherein said rotor is employed in a galvanometer.

31. The rotor as claimed in claim 30, wherein said galvanometer is employed in a laser marking system.

32. A rotor for a galvanometer system, said rotor comprising:
a permanent magnet core;
a sleeve enclosing and attached to at least a portion of said permanent magnet core, said sleeve being formed of a material having a density of less than about 0.283 lb/in$^3$; and
at least one shaft unit that is bonded to both said permanent magnet core and to said sleeve by a solder that includes tin, silver and copper, and to which an output device may be coupled, said shaft unit being formed of a material having a damping of less than about 1/(31× 10$^6$)in$^2$/lb.

33. The rotor as claimed in claim 32, wherein said rotor further includes a coupling unit attached to said shaft unit such that the output device may be coupled to said shaft unit via said coupling unit, said coupling unit being formed of a material having a dynamic stiffness of at least about 1.00× 10$^9$ lb in$^7$/slug.

34. A rotor for a galvanometer system, said rotor comprising:
a permanent magnet core;
a sleeve enclosing and attached to at least a portion of said permanent magnet core, said sleeve being formed of a material having a density of less than about 0.283 lb/in$^3$;
at least one shaft unit that is attached to both said permanent magnet core and to said sleeve, and to which an output device may be coupled, said shaft unit being formed of a material having a dynamic stiffness of at least about 1.00×10$^9$ lb in$^7$/slug; and
a coupling unit attached to said shaft unit such that the output device may be coupled to said shaft unit via said coupling unit, said coupling unit being formed of a material having a dynamic stiffness of at least about 1.00×10$^9$ lb in$^7$/slug.

35. The rotor as claimed in claim 34, wherein said shaft unit and said coupling unit are formed of different materials.

36. The rotor as claimed in claim 34, wherein said shaft unit is formed of a material that includes titanium.

37. The rotor as claimed in claim 34, wherein said permanent magnet core, said sleeve and said shaft unit are joined to one another by solder.

38. The rotor as claimed in claim 34, wherein said shaft unit is formed of a material that includes beryllium.

39. The rotor as claimed in claim 34, wherein said galvanometer is employed in a laser marking system.

40. A rotor for a galvanometer system, said rotor comprising:
a permanent magnet core;
a sleeve enclosing and attached to at least a portion of said permanent magnet core, said sleeve being formed of a material having a density of less than about 0.283 lb/in$^3$; and
at least one shaft unit that is attached to both said permanent magnet core and to said sleeve by a solder that includes tin, silver and copper, and to which an output device may be coupled, said shaft unit being formed of a material having a dynamic stiffness of at least about 1.00×10$^9$ lb in$^7$/slug.

41. The rotor as claimed in claim 40, wherein said rotor further includes a coupling unit attached to said shaft unit such that the output device may be coupled to said shaft unit via said coupling unit, said coupling unit being formed of a material having a dynamic stiffness of at least about $1.00 \times 10^9$ lb in$^7$/slug.

42. The rotor as claimed in claim 41, wherein said shaft unit and said coupling unit are formed of different materials.

43. The rotor as claimed in claim 40, wherein said shaft unit is formed of a material that includes titanium.

44. The rotor as claimed in claim 40, wherein said shaft unit is formed of a material that includes beryllium.

45. A rotor for a galvanometer system, said rotor comprising:
   a permanent magnet core;
   a sleeve enclosing and attached to at least a portion of said permanent magnet core, said sleeve being formed of a material having a density of less than about 0.283 lb/in$^3$;
   at least one shaft unit that is attached to both said permanent magnet core and to said sleeve, and to which an output device may be coupled, said shaft unit being formed of a material having a modulus of elasticity of at least about $31 \times 10^6$ psi; and
   a coupling unit attached to said shaft unit such that the output device may be coupled to said shaft unit via said coupling unit, said coupling unit being formed of a material having a dynamic stiffness of at least about $1.00 \times 10^9$ lb in$^7$/slug.

46. The rotor as claimed in claim 45, wherein said shaft unit and said coupling unit are formed of different materials.

47. The rotor as claimed in claim 45, wherein said shaft unit is formed of a material that includes beryllium.

48. A rotor for a galvanometer system, said rotor comprising:
   a permanent magnet core;
   a sleeve enclosing and attached to at least a portion of said permanent magnet core, said sleeve being formed of a material having a density of less than about 0.283 lb/in$^3$; and
   at least one shaft unit that is attached to both said permanent magnet core and to said sleeve by a solder that includes tin, silver and copper that is introduced through a tap hole in said sleeve, and to which an output device may be coupled, said shaft unit being formed of a material having a modulus of elasticity of at least about $31 \times 10^6$ psi.

49. The rotor as claimed in claim 48, wherein said rotor further includes a coupling unit attached to said shaft unit such that the output device may be coupled to said shaft unit via said coupling unit, said coupling unit being formed of a material having a dynamic stiffness of at least about $1.00 \times 10^9$ lb in$^7$/slug.

50. The rotor as claimed in claim 49, wherein said shaft unit and said coupling unit are formed of different materials.

* * * * *

UNITED STATES PATENT AND TRADEMARK OFFICE
CERTIFICATE OF CORRECTION

PATENT NO.       : 7,365,464 B2
APPLICATION NO.  : 10/931443
DATED            : April 29, 2008
INVENTOR(S)      : David C. Brown Page 1 of 1

It is certified that error appears in the above-identified patent and that said Letters Patent is hereby corrected as shown below:

In Claim 18, Col. 3, line 26, please delete "attached" and replace with --bonded--.

Signed and Sealed this

First Day of July, 2008

JON W. DUDAS
*Director of the United States Patent and Trademark Office*